(12) United States Patent
Maguire

(10) Patent No.: US 7,416,096 B2
(45) Date of Patent: Aug. 26, 2008

(54) APPARATUS FOR SUPPLYING LIQUID COLOR

(76) Inventor: Stephen B. Maguire, 1549 E. Street Rd., Glen Mills, PA (US) 19342

( * ) Notice: Subject to any disclaimer, the term of this patent is extended or adjusted under 35 U.S.C. 154(b) by 0 days.

(21) Appl. No.: 10/066,338

(22) Filed: Jan. 31, 2002

(65) Prior Publication Data

US 2003/0142580 A1    Jul. 31, 2003

Related U.S. Application Data

(60) Provisional application No. 60/265,347, filed on Jan. 31, 2001.

(51) Int. Cl.
*B67D 5/44* (2006.01)
(52) U.S. Cl. .................. 222/334; 222/333; 222/409; 366/182.2; 417/413.1
(58) Field of Classification Search .......... 222/333, 222/334, 409; 417/395, 398, 405, 413.1; 366/182.2, 182.3, 182.4
See application file for complete search history.

(56) References Cited

U.S. PATENT DOCUMENTS

| | | | | |
|---|---|---|---|---|
| 1,489,348 A | * | 4/1924 | Hampton | 123/495 |
| 2,188,646 A | * | 1/1940 | Bunch | 222/255 |
| 2,199,657 A | | 5/1940 | Bunch | 222/334 |
| 2,606,696 A | * | 8/1952 | Miner | 222/334 |
| 2,656,828 A | * | 10/1953 | Conover | 123/198 R |
| 2,665,825 A | * | 1/1954 | Poitras et al. | 222/209 |
| 3,814,388 A | | 6/1974 | Jakob | 366/131 |
| 3,957,399 A | | 5/1976 | Siczek | 417/387 |
| 4,185,948 A | | 1/1980 | Maguire | 417/477 |
| 4,473,173 A | | 9/1984 | DeGroff et al. | 222/63 |
| 4,571,416 A | | 2/1986 | Jarzombek et al. | 524/474 |
| 4,606,710 A | | 8/1986 | Maguire | 417/477 |
| 5,225,210 A | | 7/1993 | Shimoda | 425/145 |
| 6,007,236 A | | 12/1999 | Maguire | 366/141 |
| 6,719,453 B2 | | 4/2004 | Cosman et al. | 366/141 |

FOREIGN PATENT DOCUMENTS

GB    1145752    3/1969

OTHER PUBLICATIONS

Forty-four page two-sided brochure including cover and back pages entitled "Maguire: Auxiliary equipment for the plastics industry" of Maguire Products, Inc., Oct. 2000.
Two-sided color brochure entitled Maguire: Model MPA Liquid Color Pump, Maguire Products, Inc., undated.
International Search Report dated Feb. 20, 2003 in connection with corresponding application PCT/US02/02934.
Written Opinion dated Mar. 24, 2003 in connection with corresponding application PCT/US02/02934.

* cited by examiner

*Primary Examiner*—David Sorkin
(74) *Attorney, Agent, or Firm*—Charles N. Quinn, Esq.

(57) ABSTRACT

A container of liquid color material has a diaphragm liquid color pump located therewithin for providing liquid color from the container and non-drip apparatus for releaseably connecting the container with a blender for supply of liquid color thereto and methods for pumping and supplying liquid color incorporating the same.

44 Claims, 9 Drawing Sheets

APPARATUS FOR SUPPLYING LIQUID COLOR

This application claims priority from U.S. provisional patent application No. 60/265,347 filed Jan. 31, 2001 entitled "Liquid Color Pumping Method And Supply Apparatus".

SUMMARY OF THE INVENTION

In one of its aspects, this invention provides a low cost liquid color pump which may be positioned in a liquid color material shipping container, which may include a liquid-tight disconnect, allowing provision of the liquid color output from the pump to a plastics material processing machine in which the liquid color imparts color directly to plastic parts being manufactured or to plastic resin material being blended for subsequent fabrication by a plastic material processing machine. An air line may power the pump within the container and is desirably connected to a source of pressurized air.

In accordance with the invention, liquid color containers are desirably sealed at the liquid color factory so that a purchaser of the liquid color material never opens the container or has any access to the liquid color material in the container, except through preferably self-sealing quick disconnect connections which shut off when disconnected, thereby preventing liquid color outflow from the container.

Desirably, a pump in accordance with the invention is a diaphragm pump, generally cylindrical in shape, and preferably on the order of about three inches (3"), which is about seven and one-half (7.5) centimeters, in diameter by about one and one-half inches (1½") which is about two (2.0) centimeters, thick. Most desirably, a flat diaphragm is sandwiched between a pump upper portion and a body having an exterior which is preferably in the general shape of a cylinder. The body desirably has an open interior defined by a cavity which preferably step-wise tapers down from a relatively large size to a liquid inlet aperture preferably located in the center of the bottom of the body. A ball, desirably about three quarters of an inch, which is about two centimeters, in diameter, is movable vertically and seats on the inlet aperture at the bottom of the open interior cavity, acting as a check valve allowing liquid to enter, but not leave, through the inlet defined by the aperture. An outlet port is formed in the side of the pump body.

Desirably a spring within the pump biases the diaphragm in a direction away from the open interior cavity.

A pneumatically driven piston rod extension desirably reciprocably displaces the diaphragm towards the open interior cavity, displacing liquid color from the pump open interior cavity out through the outlet aperture. The spring desirably returns the diaphragm at least to the diaphragm original flat or neutral position and preferably past such neutral position, thereby sucking in liquid color through the inlet aperture which is preferably directly below the diaphragm.

In another one of its aspects, this invention provides apparatus for furnishing liquid color on demand to a plastics processing machine where the apparatus includes a closeable container having at least one outlet preferably self-sealing, with diaphragm pump means connected to and housed within the container interior for pumping liquid out of the container via the outlet connection, responsive to pressurized gas. The closeable container is difficult, indeed nearly impossible, for the customer to open. This feature in combination with the self-sealing outlet, minimizes the likelihood of the liquid color customer spilling any significant amount of liquid color material in the customer's plastics material processing facility.

In yet another one of its aspects, this invention provides apparatus for furnishing liquid color on demand where the apparatus includes a container having a quick-disconnect, self-sealing outlet connection. Preferably, the apparatus further includes a pneumatic piston-cylinder combination removably connected to the container and adapted for pneumatically-driven reciprocation of an output shaft portion of the combination. The apparatus further preferably includes a reciprocable rod within the container with a first end of the rod being adapted for reciprocating driving of the rod by an output shaft of the piston-cylinder combination. The apparatus preferably further includes diaphragm pump means connected to and housed at least partially and preferably wholly within the container for pumping the liquid color out of the container via the outlet connection. The pump includes a diaphragm and a spring for biasing the diaphragm away from an open interior cavity portion of the pump. The diaphragm is displaceable into the open interior cavity portion responsively to reciprocating motion of the rod to displace fluid from the open interior cavity of a pump body within which the diaphragm is positioned.

The invention may further embrace means for releasably retaining the piston-cylinder combination in position on the container for reciprocating contact of the piston-cylinder combination with the rod, where the releasable retaining means may further include a moveable sleeve connected to the piston-cylinder combination. The sleeve desirably has at least one slot extending first axially away from the terminus of the sleeve, towards the piston-cylindrical combination and then in an annular direction partially around the sleeve.

In yet another of its aspects this invention may embrace a method for furnishing liquid color to a plastics resin processing machine where the method includes providing a closed container having at least one outlet connection with the container having liquid color material therewithin, pumping the liquid color material out of the container via the outlet connection by pneumatically or mechanically reciprocating a diaphragm to displace the diaphragm into a body including an open interior cavity thereby forcing liquid color material within the body through an aperture in the body and out of the container via the outlet connection.

In yet another of its aspects, this invention embraces a liquid color diaphragm pump where the pump includes a body having a cavity formed therein and a cover connected to the body. A flexible diaphragm separates the cover from the cavity. The cover has a relief located proximate to the portion of the diaphragm which separates the cover from the cavity with the relief providing space between the cover and the diaphragm. The pump further includes means for cyclically displacing the diaphragm away from the relief area of the cover and into the cavity. The pump preferably further includes means for biasing the diaphragm away from the cavity, towards the relief area of the cover and into the space thereunder during a portion of each reciprocating cycle of diaphragm displacement.

Desirably, the means for cyclically displacing the diaphragm is a reciprocating means and contacts the diaphragm. Further desirably, the means for biasing the diaphragm away from the cavity is a spring, most preferably a coil spring. The body of the pump preferably has a passageway connecting a body bottom surface to the cavity with at least a portion of the passageway being substantially vertical and the pump further comprising a freely vertically moveable ball residing within the cavity vertical portion for blocking downward liquid flow within the cavity vertical portion. The vertically freely moveable ball is preferably resident within the spring so that the spring constrains the ball against lateral movement.

DESCRIPTION OF THE PREFERRED EMBODIMENTS AND BEST MODE KNOWN FOR PRACTICING THE INVENTION

Figure 1:
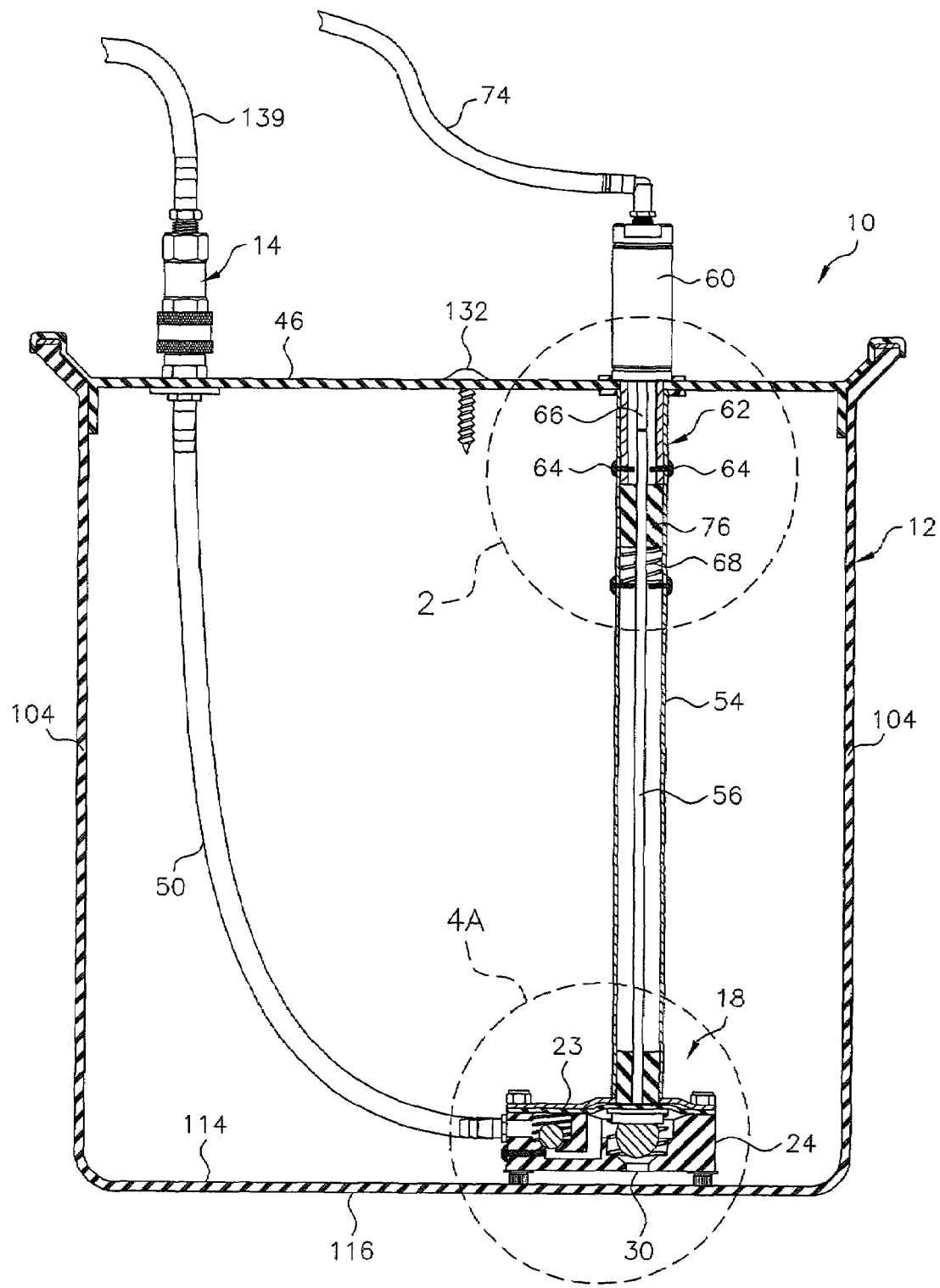
FIG. 1 is a schematic front assembly view, with many of the parts depicted in section, of a container used for supply of liquid color material and having a liquid color pump therewithin, all in accordance with the invention

Referring to the drawings in general and to FIG. 1 in particular, apparatus for furnishing liquid color material to a plastics resin processing machine is depicted largely in section in front elevation and designated generally 10. The apparatus includes a closeable container 12 having a preferably quick disconnect self-sealing outlet connection 14. Closeable container 12 includes a lid 46 and a body 104. Lid 46 is preferably secured to body 104 in a manner such that removal of lid 46 from body 104 by a purchaser of liquid color material within container 12 is very difficult. This may be accomplished by mechanically crimping, cementing, welding or otherwise securing the periphery of lid 46 to illustrated unnumbered angularly upwardly extending lip portions defining the upper extremities of body 104.

A diaphragm pump is designated generally 18 and is positioned within closeable container 12 as illustrated in FIG. 1. Diaphragm pump 18 includes a body 24 which is preferably generally cylindrical and preferably has an open interior portion 26 defining an interior cavity. A first aperture 30, best shown in FIGS. 3, 4A and 4B, is formed in a downwardly facing bottom exterior surface 118 of pump body 24 and serves as an inlet aperture for liquid color material entering diaphragm pump 18.

As best shown in FIG. 1, diaphragm pump 18 preferably contacts and rests on the interior surface 114 of the bottom 116 of container body 104. Most desirably, downwardly facing bottom exterior surface 118 of pump body 24 is closely spaced from interior surface 114 of bottom 116 of container body 104 by the heads of bolts 100, which secure diaphragm pump 18 together, resting on interior surface 114. The resulting close spacing of downwardly facing pump bottom surface 118 from container interior surface 114, which spacing preferably is on the order of one-quarter inch or less, assures that diaphragm pump 18 evacuates substantially all liquid color material within container 12 before container 12 is recycled.

Figure 3:
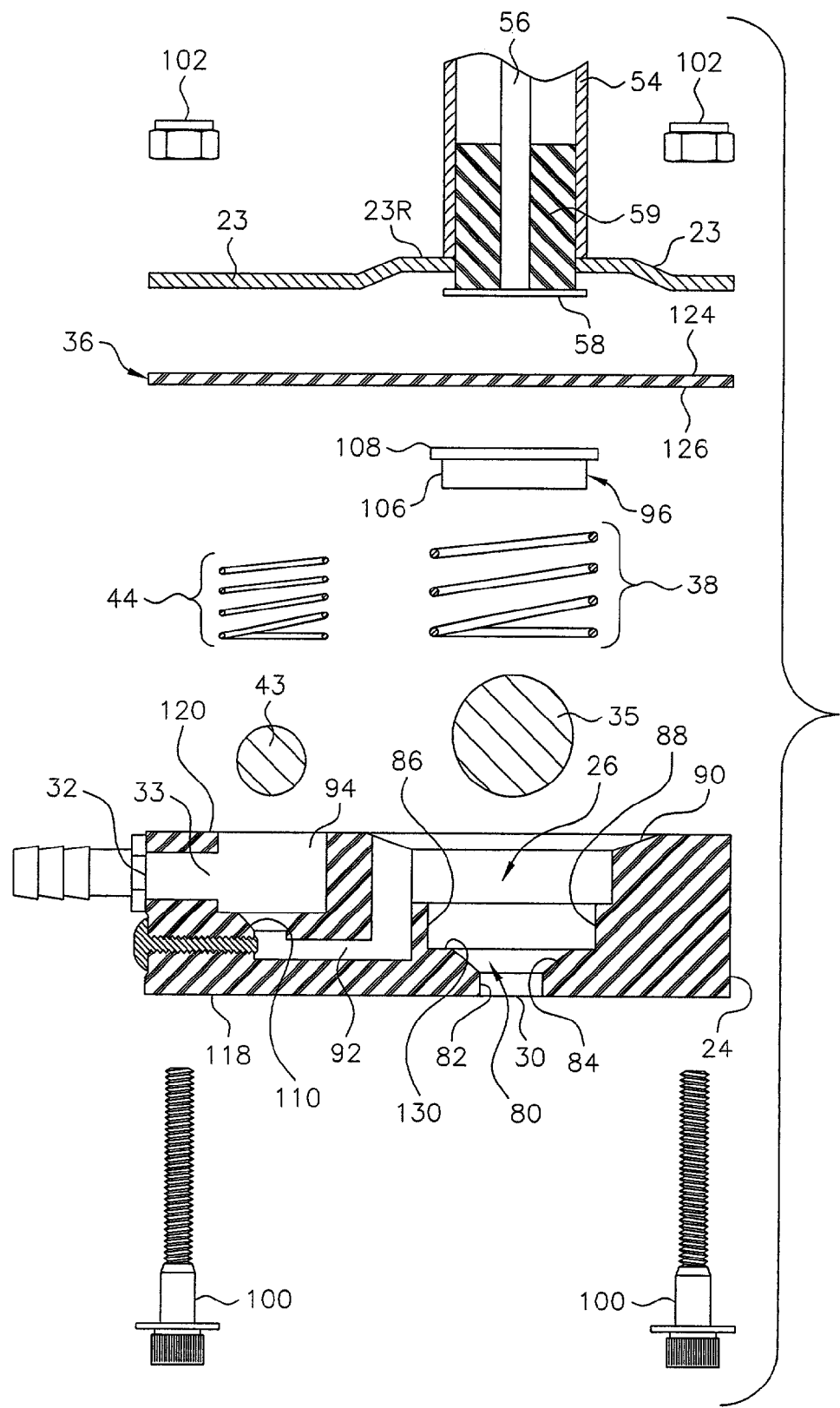
FIG. 3 is an exploded front view with some parts depicted in section showing details of a portion of the structure of FIG. 1 indicated generally by dotted circle 4A in FIG. 1.

Referring to FIGS. 1 and 3, bolts 100 threadedly engage nuts 102 thereby securing the assembly of diaphragm pump 18 together. Bolts 100 pass through bores formed in pump body 24, diaphragm 36 and pump upper portion 23 to secure diaphragm pump 18 together, with the assembly being effectuated in a manner shown by the exploded view of FIG. 3. The bore passageways through which bolts 100 pass in pump body 24, diaphragm 36 and pump upper portion 23 are not illustrated in the drawings to facilitate drawing clarity. Diaphragm pump 18 in its assembled form secured together by bolts 100 and nuts 102 is illustrated in greater detail in FIGS. 4A and 4B.

Figure 4A:
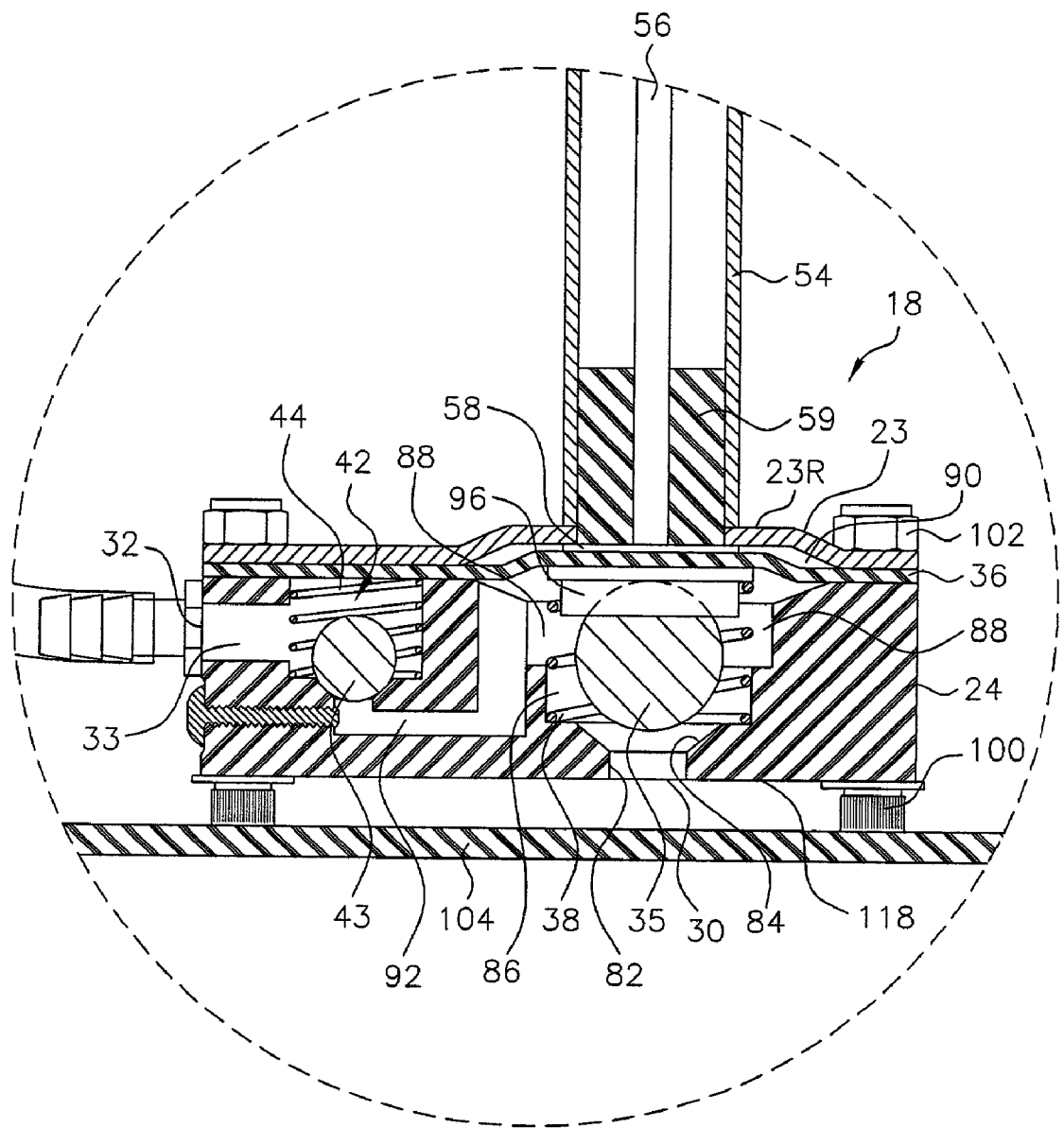
FIG. 4A is an enlarged front assembly view, with most of the parts shown in section, of the structure indicated generally by dotted circle 4A in FIG. 1, with a diaphragm portion of the structure undisplaced.
Figure 4B:
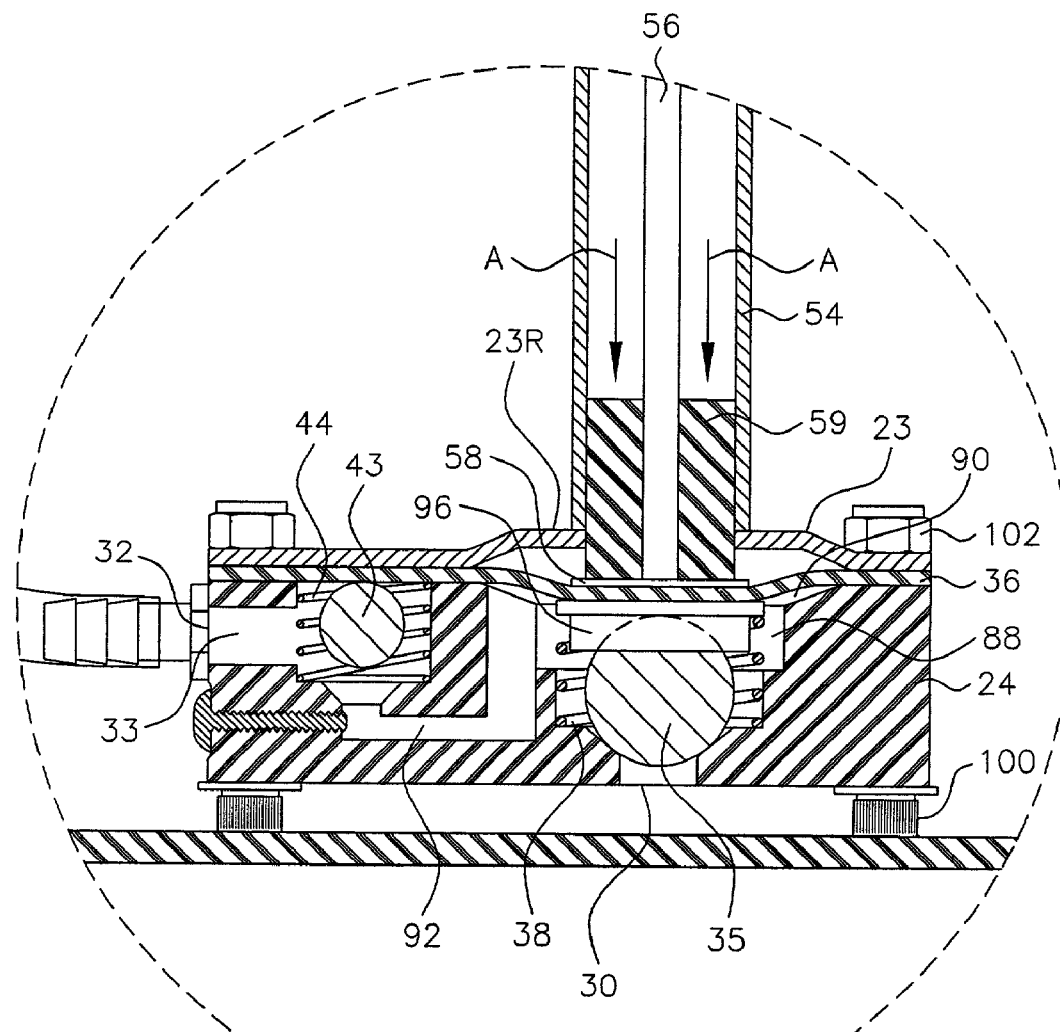
FIG. 4B is an enlarged front assembly view, with most of the parts shown in section, of the structure indicated generally by dotted circle 4A in FIG. 1, with the diaphragm portion of the structure depicted displaced and pumping liquid color.

As best shown in FIGS. 3, 4A and 4B, within pump body 24 an inlet check valve 34 is positioned within first or inlet aperture 30. Inlet check valve 34 includes a ball 35 biased by its own weight against a conical seat portion of an inlet passageway 80 leading into pump body 24 from first or inlet aperture 30. An inlet passageway formed in pump body 24 and leading to open interior cavity portion 26 is designated generally 80 in FIG. 3 and commences at first or inlet aperture 30 formed in downwardly facing exterior bottom surface 118 of pump body 24. Inlet passageway 80 has a first minor cylindrical portion 82 bordering first or inlet aperture 30.

Still referring principally to FIGS. 3, 4A and 4B, inboard of cylindrical portion 82 in inlet passageway 80 is a conical seat portion 84 which tapers to enlarge passageway 80 from a relatively small diameter at first or inlet aperture 30 to a larger diameter. Conical seat portion 84 terminates at a second intermediate cylindrical portion 86 of inlet passageway 80; second intermediate cylindrical portion 86 is preferably of larger diameter than the maximum diameter of conical seat portion 84.

Second intermediate cylindrical portion 86 in turn leads to third major cylindrical portion 88 which together with second immediate cylindrical portion 86 and conical diaphragm receiving portion 90 discussed below, largely defines an open interior cavity portion 26 of pump body 24. As illustrated in FIG. 3, axial length of third major cylindrical portion 88 preferably exceeds axial length of second intermediate cylindrical portion 86 as well as the individual axial lengths of conical seat portion 84 and first minor cylindrical portion 82. Third major cylindrical portion 88 terminates at juncture with a conical diaphragm receiving portion 90 which in turn tapers from the diameter of third major cylindrical portion 88 to an even larger diameter at an upwardly facing preferably planar top surface 120 of pump body 24 of diaphragm pump 18.

Referring to FIGS. 1, 3, 4A and 4B, a coil spring 38 resides within inlet passageway 80 and fits slidably about ball 35. Coil spring 38 constrains ball 35 against lateral movement within inlet passageway 80 but does not bias ball 35 vertically. Coil spring 38 preferably seats on an annular surface of second intermediate cylindrical portion 86 defining a portion of inlet passageway 80. The annular surface on which spring 38 seats is identified 130 and is radially outboard and in contact with conical seat portion 84 of inlet passageway 80.

The end of spring 38 oppositely that which seats on annular surface 130 carries a spring cap 96 which includes hollow cylindrical body portion 106 and a solid planar top portion 108 as illustrated in FIG. 3. Hollow cylindrical body portion 106 preferably fits in contact with the interior of coil spring 38, with coil spring 38 abutting an annular, downwardly facing surface of solid planar top portion 108 of spring cap 96.

Still referring principally to FIGS. 3, 4A and 4B, spring cap 96 facilitates constant application of bias by spring 38 against lower or downwardly facing surface 126 of diaphragm 36. Spring 38 is preferably selected with spring constant and dimensions such that spring 38 continuously biases diaphragm 36 upwardly, against flange 58 in a manner that diaphragm 36 and flange 58 are constantly in facing contact one with another. The position of diaphragm 36, flange 58, spring 38 and spring cap 96 when diaphragm 36 is in the extreme upward position and still in contact with flange 58 is illustrated in FIG. 4A; the position of these components when diaphragm 36 is in the extreme downward position, at which diaphragm 36 is still in contact with flange 58, is illustrated in FIG. 4B. Hence, FIGS. 4A and 4B illustrate the respective limits of travel and limits of flexure of diaphragm 36 during reciprocation of actuator rod 56 as reciprocably driven by piston-cylinder combination 60. In FIG. 4B, double arrows A denote downward force being exerted by actuator rod 56 on diaphragm 36, where such downward force has overcome the upwardly directed force of spring 38 and any resilient resistive force resulting from deformation of diaphragm 36 away from its neutral, unflexed position. The neutral, unflexed position of diaphragm 36 has not been illustrated in the drawings.

First inlet check valve is designated generally 34 and is defined by ball 35 contacting conical seat 84. Pump body 24 includes an intermediate outflow passageway 92 leading from open interior cavity portion 26 to an intermediate vertical chamber 40, which in turn opens into an outlet passageway 33 for discharge of liquid color material pumped by diaphragm pump 18. The entrance to intermediate outflow passageway 92 is desirably located in an upper extremity of a surface bounding open interior cavity portion 26 of pump body 24, as illustrated in FIG. 1. This positioning minimizes the risk of any air bubbles which may form in cavity 26 being delivered out of the pump with the liquid color. The outlet from diaphragm pump 18 is defined by second or outlet aperture 32. An outlet fitting 122 is illustrated occupying second or outlet aperture 32 in FIG. 3.

Desirably a second, outlet check valve designated generally 42 has a ball 43 seating vertically due to force of gravity against a preferably conical seat 110 formed in an vertically elongated intermediate chamber 40. Outlet check valve 42 ensures that liquid color material only travels in one direction, namely outwardly, through outlet passageway 33. Ball 43 is moveable freely in the vertical direction. The weight of ball 43 seats ball 43 on conical seat 110. Force of liquid color moving through intermediate outflow passageway 92 into intermediate chamber 40 lifts ball 43 off of conical seat 110. Any attempted flow of liquid color material from intermediate chamber 40 back into intermediate outflow passageway 92 is precluded as ball 43 comes to rest on conical seat 110. A coil spring 44 within chamber 94 desirably fits about ball 43 and constrains ball 43 from lateral movement within vertically elongated chamber 94. Spring 44 does not exert any vertical force on ball 43; ball 43 is vertically freely moveable within the interior of coil spring 44 in chamber 94. Spring 44, by precluding lateral movement of ball 43, reduces the likelihood of ball 43 sticking and thereby rendering the second or outlet check valve 42 inoperable.

First inlet check valve designated generally 34 and defined by ball 35 contacting conical seat portion 84 assures that liquid color material entering open interior cavity portion 26 of pump body 24 exits pump body 24 via outlet passageway 33 and outlet aperture 32, not via inlet aperture 30 and inlet passageway 80.

Diaphragm 36 is moved in a first direction, downwardly considering the drawings, towards and into open interior cavity portion 26 by a flange 58 which contacts an upper surface 124 of diaphragm 36. An opposite, lower surface 126 of diaphragm 36 faces open interior cavity portion 26 of pump body 24. Flange 58 is preferably secured to an end of actuator rod 56 as illustrated in FIGS. 1, 3, 4A and 4B. A flange support spacer 59 is preferably fixed to the upper surface of flange 58 and to the portion of actuator rod 56 immediately adjacent flange 58 and provides a bearing surface between actuator rod 56 and the interior surface of cylinder 54. Preferably flange support spacer 59 is a solid plastic material having good lubricity properties.

Figure 2:
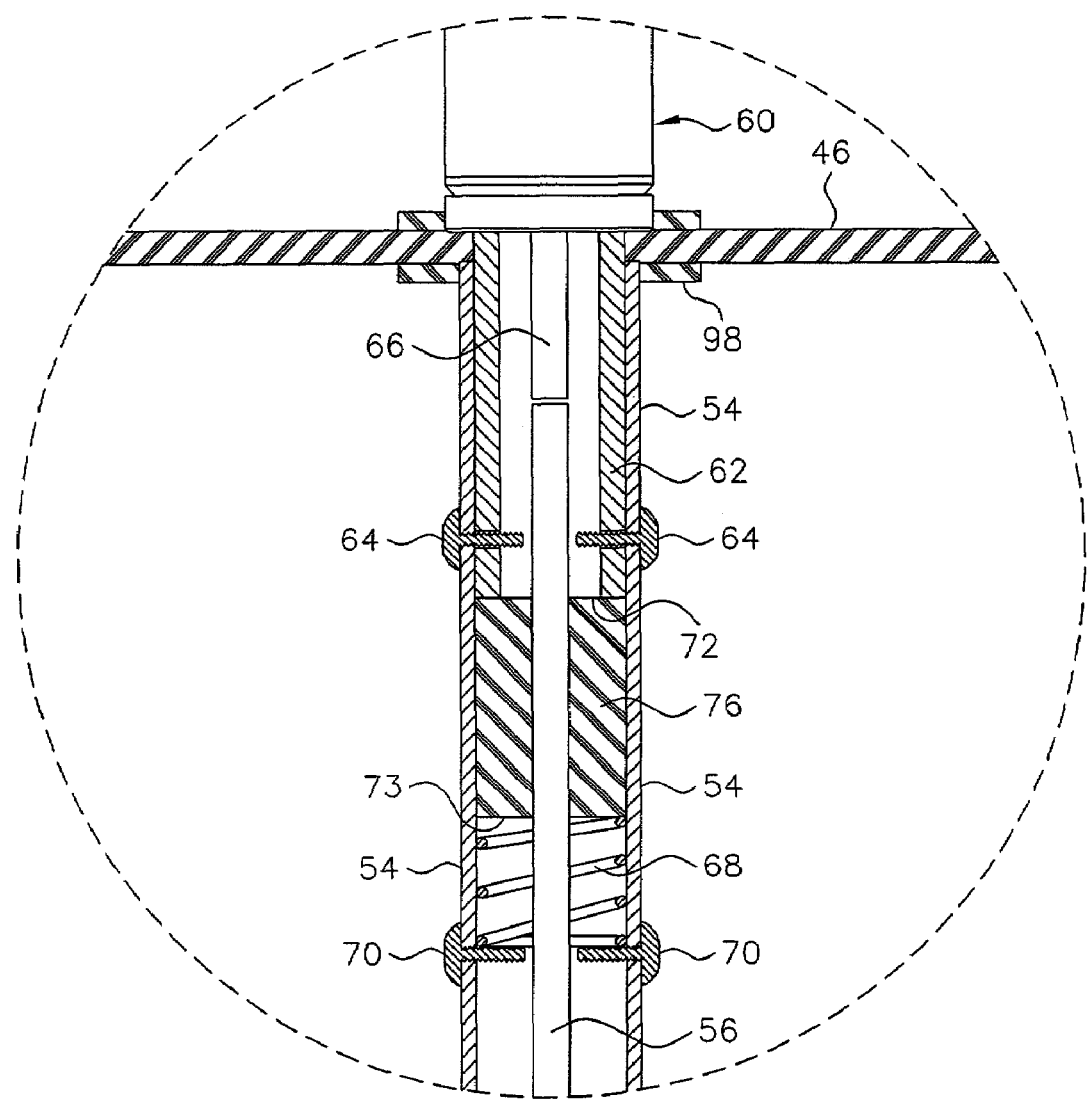
FIG. 2 is an enlarged front view in section showing details of structure indicated generally by dotted circle 2 in FIG. 1.

Actuator rod 56 is housed reciprocably within a container interior cylinder 54, which is a hollow tube connected at one end to a pump upper cover or upper portion 23 of diaphragm pump 18 as illustrated in FIG. 1 and connected at the opposite end to the lid 46 of closeable container 12 as illustrated in FIGS. 1 and 2.

The end of actuator rod 56 opposite that to which flange 58 is affixed is adapted for abutting contact by a rod 66 extending from a piston-cylinder combination 60 as illustrated in FIGS. 1 and 2. Piston-cylinder combination 60 is preferably a commercially available pneumatically driven piston-cylinder combination such is that sold under the trademark SMC Cylinder. This piston-cylinder combination receives pressurized air and reciprocates in response thereto. Reciprocating motion provided by piston-cylinder combination 60 works to reciprocate actuator rod 56 through contact thereof with rod 66 extending from piston-cylinder combination 60. Hence, reciprocation of piston-cylinder combination 60 results in reciprocation of flange 58 in the vertical direction.

Referring to FIG. 2, preferably pneumatically powered piston-cylinder combination 60 is desirably equipped with a hollow cylindrical adapter 62 extending axially from piston-cylinder combination 60. Cylindrical adapter 62 houses a piston rod 66 which is drivingly actuated by piston-cylinder combination 60. Adapter 62 is preferably fixedly connected to piston-cylinder combination 60; adapter 62 is not movable relative to piston-cylinder combination 60.

A spring 68 is located at the distal end of container interior cylinder 54 relative to diaphragm pump 18 and is retained in position within container interior cylinder 54 by screws or other suitable securing means indicated 70 in FIG. 2. Spring 68 is compressible in a vertical direction considering FIG. 2 by contact with lower annular extremity surface 73 of a cylindrical spacer 76 as spacer 76 moves downwardly due to contact with cylindrical adapter 62 upon downward movement of adapter 62 as piston-cylinder combination 60 is fixed into position. Spacer 76 helps to retain spring 68 in position within hollow interior cylinder 54.

A pair of radially opposed positioning pins, desirably in the form of screws 64, extend radially inwardly within container interior cylinder 54, at a position close to but somewhat removed from the upper extremity thereof as illustrated in FIG. 2. Cylindrical adapter 62 has a pair of radially opposed slots which open vertically downwardly into lower annular extremity surface 72 of adapter 62. Those slots, which are not visible in FIG. 2 and hence do not have indicator numerals associated therewith, extend axially within cylindrical adapter 62 away from lower annular extremity surface 72 and then turn ninety degrees (90°) and extend a short distance angularly around cylindrical adapter 62. These slots extend entirely through the wall of cylindrical adapter 62. These slots are configured substantially similar to slots 128 illustrated in FIG. 6.

With this slot configuration, when piston-cylinder combination 60 is positioned so that cylindrical adapter 62 is inserted downwardly into the open interior of cylinder 54, the openings of the slots formed in lower annular extremity surface 72 of cylindrical adapter 62 initially engage positioning pins provided in the form of screws 64.

As cylindrical adapter 62 is manually forced downwardly in FIG. 2 against upward force exerted on spacer 76 by coil spring 68, with the axial portions of the slots in cylindrical adapter 62 engaged by screws 64, once adapter 62 has moved sufficiently downwardly (in FIG. 2) that spring 68 is adequately compressed, piston-cylinder combination 60 and cylindrical adapter 62 may be manually rotated, causing the angular or circumferential portions of the unnumbered slots to engage screws 64. Once this manual rotation is complete and downward (considering FIG. 2), manual force on piston-cylinder combination 60 and cylindrical adapter 62 is released, spring 68 urges piston-cylinder combination 60 vertically upwardly (considering FIG. 2). This causes the angular extremity surfaces of the slots to contact lower surfaces of screws 64 thereby securing piston-cylinder combination 60 and adapter 62 securely in place.

Figure 6:
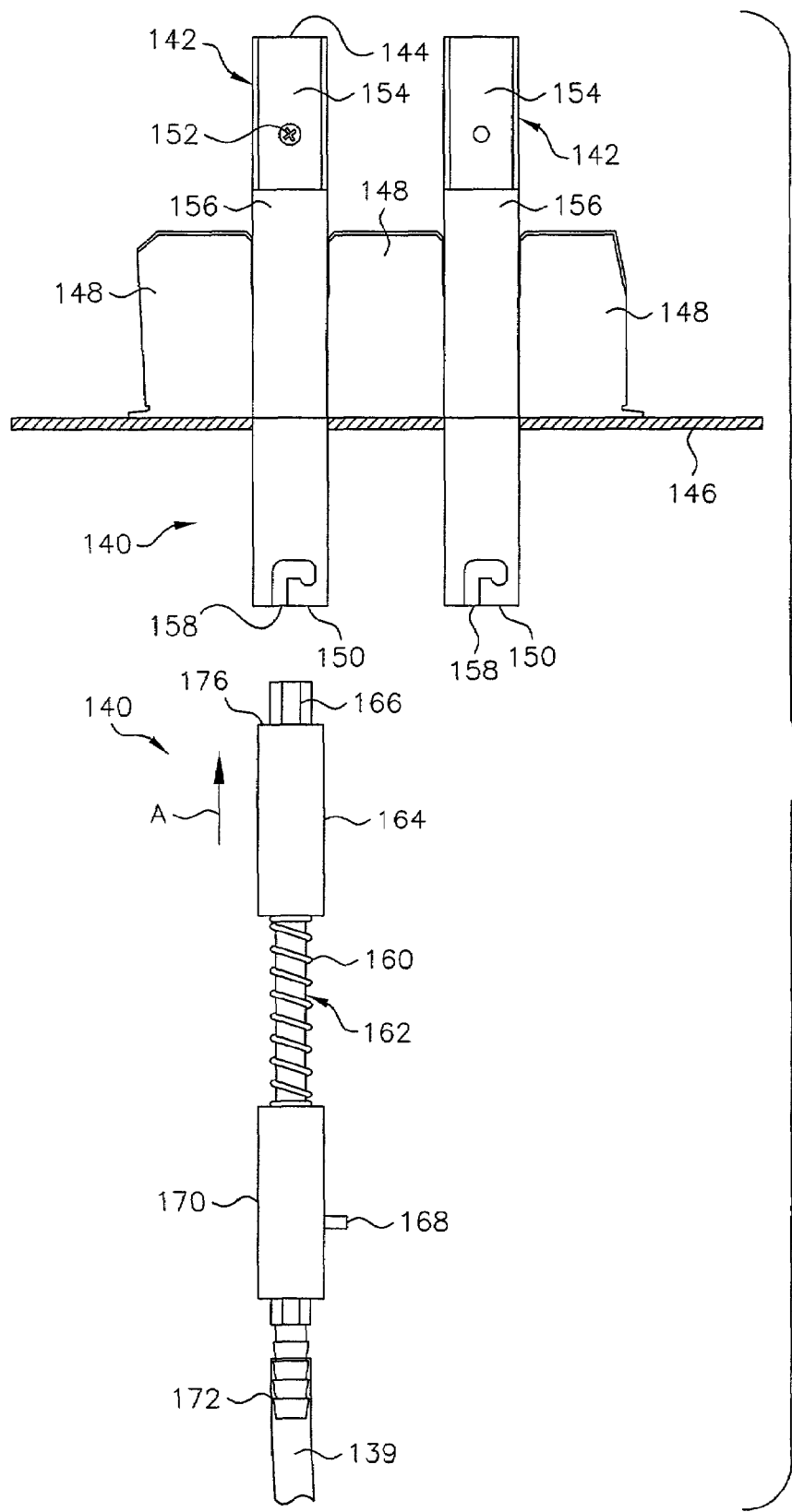
FIG. 6 is a bottom partially schematic view of dripless liquid color connection apparatus adapted for attachment to a gravimetric blender for serially supply of liquid color material to the weigh bin of the blender and on-the-fly changeover from an empty liquid color container to a full liquid color container without production interruption, in which only one connector for a liquid color container is illustrated, disengaged from the connection apparatus.

To assure retention of piston-cylinder combination 60 in position, the angular extremity portions of the slots, at the ends remote from juncture with the longitudinal extending portions of the slots, similar to slots 128 illustrated in FIG. 6, have small undercuts extending axially away from piston-cylinder combination 60. These undercuts receive screws 64 and positively retain screws 64 in place, until axial and rotary manual force is applied to piston-cylinder combination 60.

To remove piston-cylinder combination 60, the sequence of movements described above is reversed.

As illustrated in FIG. 2, the upper extremity of container interior cylinder 54 desirably is in abutting contact with the lower interior surface of lid 46 of container 12. Container interior cylinder 54 is preferably secured to lid 46 in some permanent fashion, for example by welding. As a result, when piston-cylinder combination 60 and adapter 62 are removed through application of angular and axial manual force to piston-cylinder combination 60, container interior cylinder 54 remains in place, being preferably fixedly secured to the interior of lid 46. Desirably, a liquid-tight fitting 98 of generally annular shape is provided about the exterior of container interior cylinder 54 at the position of juncture with lid 46 as illustrated in FIG. 2; this assures liquid-tight sealing about container interior cylinder 54 at the position of juncture with lid 46. It is further desirable that a stopper or other device be provided to occupy the interior opening of container interior cylinder 54 when pneumatic piston-cylinder combination 60 and adapter 62 have been removed. This provides additional assurance against any leakage of liquid color material out of container 12.

Figure 5:
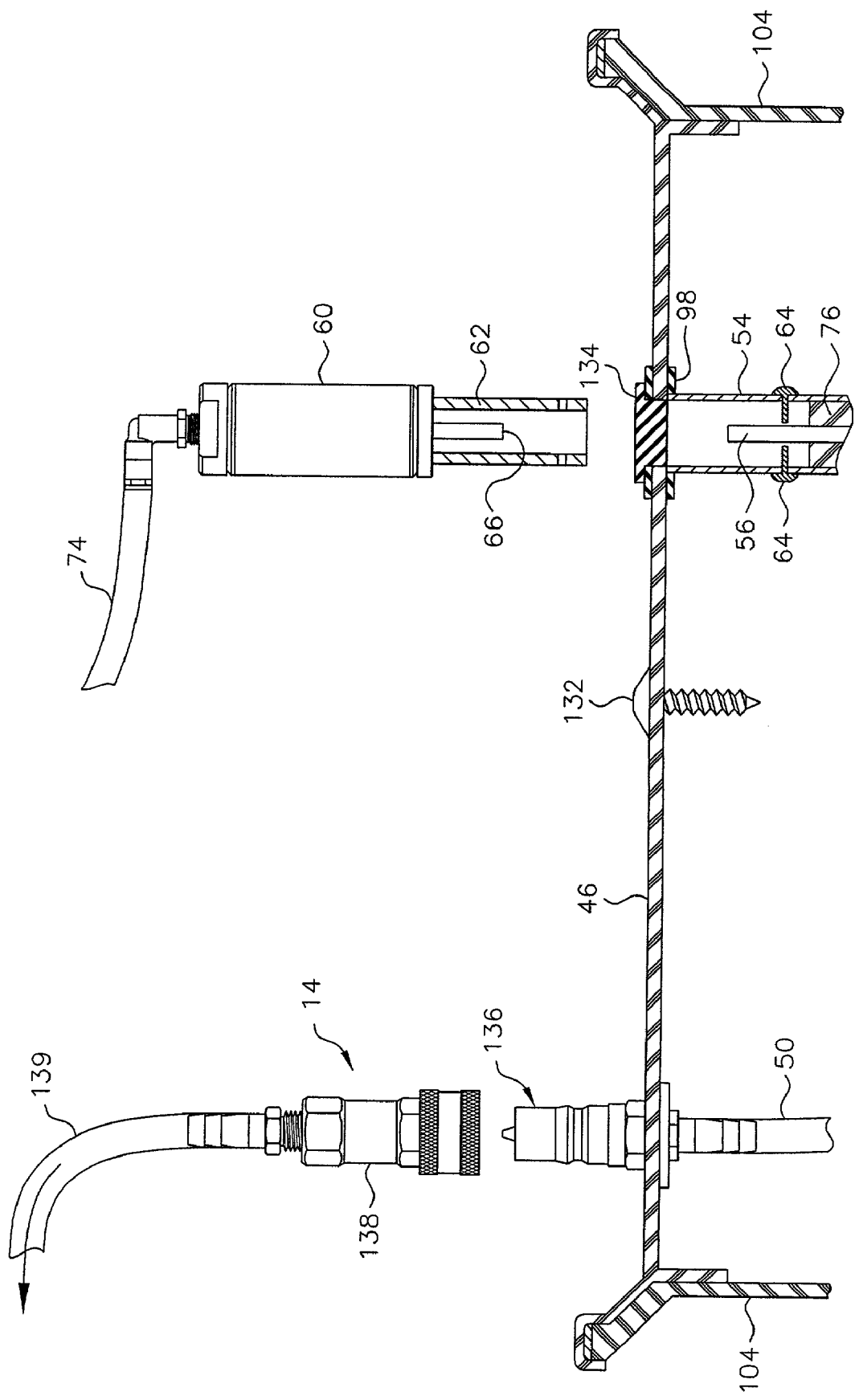
FIG. 5 is a broken sectional view of the lid portion of the container illustrated in FIG. 1 illustrating the container replacability and color on-the-fly switchover facilitated by the invention.

Referring to FIG. 5 which is a broken view mostly in section of the upper portion of container body 104 and lid 46, the quick disconnect, disposable and recyclable feature of container 12 is illustrated. Specifically in FIG. 5, the self-sealing quick disconnect fitting 14 is shown disconnected, revealing a self-sealer male portion 136 and a self-sealer female portion 138. Male portion 136 is preferably essentially permanently secured to lid 46 of container 12 while female portion 138 is connected to a color supply line 139 leading to a gravimetric blender or other device which receives and uses the liquid color furnished by diaphragm pump 18. The individual parts of male and female portions 136, 138 of self-sealing quick disconnect fitting 14 have not been separately numbered and are not separately described herein since the preferred self-sealing quick disconnect fitting is of a type well known in the plastics material processing art and in other fields. Fitting 14 can be disengaged by separating female portion 138 from self-sealing male portion 136 via manual force; any adult of reasonable strength and dexterity can do this.

A vent screw 132 is positioned in lid 46 and may be turned manually in the event atmospheric pressure is needed in container 12 as pump 18 operates to evacuate liquid color out of container 12.

Still referring to FIG. 5, pneumatically driven piston-cylinder combination 60 and adapter 62 are shown removed from their position within lid 46, in which those components are illustrated in FIGS. 1 and 2. When piston-cylinder combination 60 and cylindrical adapter 62 are removed from lid 46, a stopper 134 is preferably put in their place, to guard against contamination entering the open interior of container interior cylinder 54. An appropriate stopper is illustrated as 134 in FIG. 5. As is the case with self-sealing quick disconnect fitting 14, piston-cylinder combination 60 and adapter 62 may be engaged with or disengaged from container interior cylinder 54 and actuator rod 56 manually by any adult of moderate strength.

To operate diaphragm pump 18, piston-cylinder combination 60 is actuated by application of gas, preferably air, thereto via input line 74. Reciprocation of the piston portion of piston-cylinder combination 60 causes corresponding reciprocation of piston rod 66. As piston rod 66 reciprocates, it contacts actuator rod 56 thereby causing actuator rod 56 to reciprocate in the vertical direction considering the drawing figures. Vertical reciprocation of rod 56 causes corresponding vertical reciprocation of flange 58. Since flange 58 is in contact with an upper surface of diaphragm 36, diaphragm 36 distends downwardly into the open interior cavity portion 26 of pump body 24.

Advancement of diaphragm 36 into open interior cavity portion 26 of pump body 24 displaces liquid color material resident therein. The displacement and resulting pressure increase causes liquid color material to flow through liquid color intermediate passageway 92, past second or outlet check valve 42, through outlet passageway 33, and out of container 10 via container liquid color outlet line 50.

During the upward portion of the reciprocation cycle of piston-cylinder combination 60 and actuator rod 56, diaphragm 36 initially moves towards its unstressed horizontal position in response to force exerted by spring 38 on spring cap 96 contacting diaphragm 36; the continued constant application of force exerted by spring 38 on spring cap 96 in contact with diaphragm 36 to distend diaphragm 36 further upwardly. The resulting void created in open interior cavity portion 26 of pump body 24 causes liquid color material to flow by suction through liquid color first or inlet aperture 30, past first or inlet check valve 34 into open interior cavity portion 26 of pump body 24. After piston-cylinder combination 60 has completed the upward portion of the reciprocation cycle and commences a new reciprocation cycle by moving piston rod 66 and hence actuator rod 56 downwardly, again pushing diaphragm 36 vertically downwardly and into open interior cavity portion 26, flange 58 again displaces diaphragm 36 against the force of spring 38 into open interior cavity portion 26 and liquid color is again urged past the second or outlet check valve 42, through liquid color outlet passageway 33 and out of container 10.

While use of a pneumatically driven piston-cylinder combination to reciprocate rod 56 is preferred, an electric motor rotating a cam or a gear could also be used, as could a hydraulic motor or a solenoid.

Figure 7:
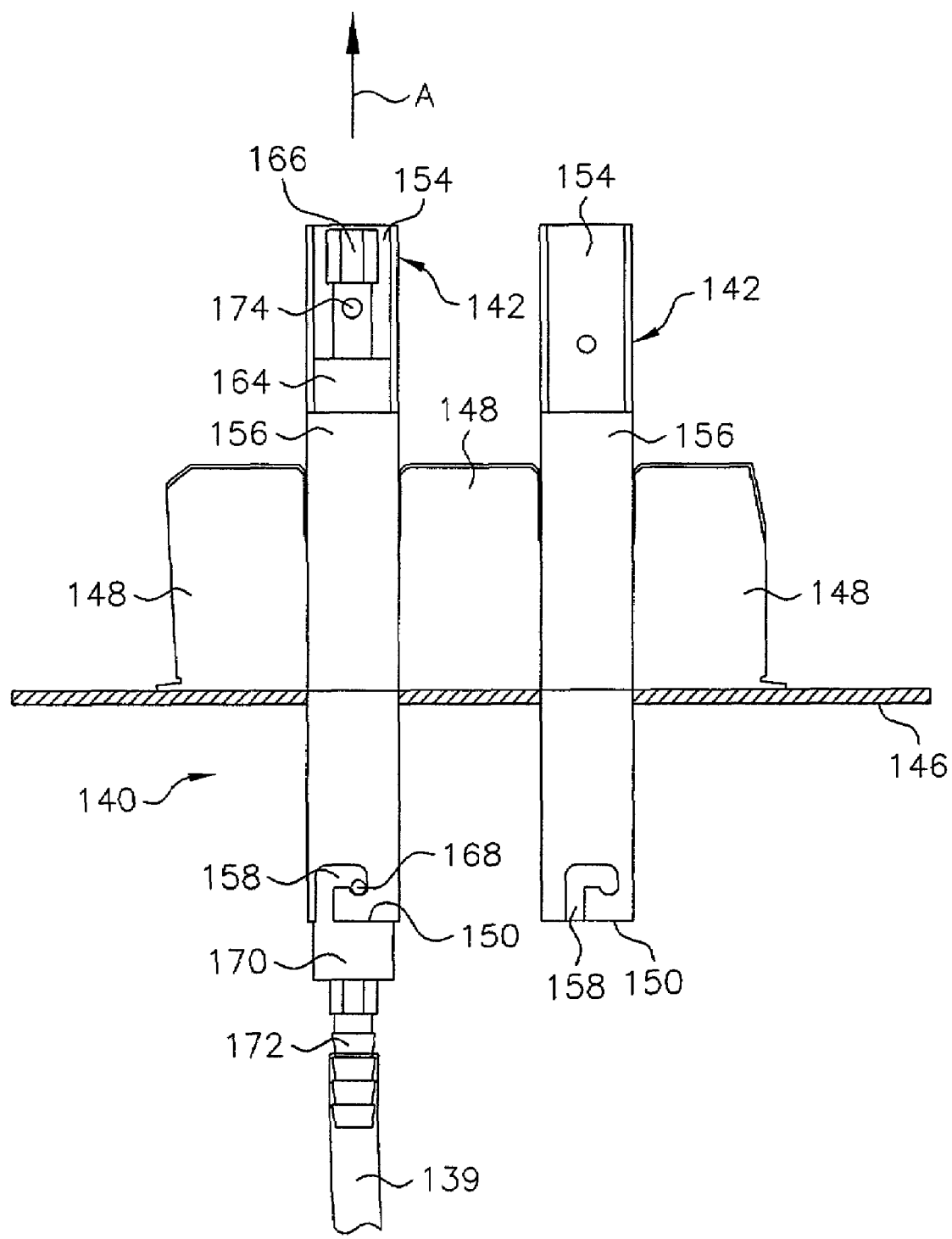
FIG. 7 is a bottom partially schematic view of the liquid color connection apparatus illustrated in FIG. 6, showing one tubular connector from a liquid color container engaged with the connection apparatus.

FIGS. 6 and 7 illustrate an embodiment of apparatus for driplessly connecting and thereafter furnishing liquid color from container 12 for subsequent processing where the apparatus is shown in a disconnected disposition in FIG. 6 and in a connected disposition in FIG. 7.

The apparatus for driplessly connecting and thereafter furnishing liquid color from a container 12 for subsequent processing is designated generally 140 in the drawings and includes a tubular member 142 secured in and passing through a mounting plate 146. A set of splash baffles 148 are connected to mounting plate 146 and to tubular member 142 in the area in which the liquid color is released and hence where some splash may occur. Tubular member 142 is hollow over its entire length; two tubular members 142 are illustrated in the embodiment illustrated in FIG. 6 and 7. Mounting plate 146 allows apparatus 140 to be fastened, by bolts or by welding, directly to the frame of a gravimetric blender so as to position one or more liquid color outlet apertures of apparatus 140 for delivery of liquid color material directly into the weigh bin of the blender.

A remaining or second end of tubular member 142 is designated 150 and is the end of tubular member 142 which remains outside the area of dispensing of liquid color material, typically being separated from such area of dispensing of liquid color material by mounting plate 146. Desirably formed within the annular facing end surface defining remaining or second end 150 of tubular member 142 is a slot 158 configured as shown in FIGS. 6 and 7. Slot 158 opens into the annular axially facing surface defining end 150 of tubular member 142. Proceeding axially from that position along tubular member 142, slot 158 has an axially extending portion followed by an angularly extending portion running at right angles to the axis of tubular member 142. At the end of the angularly extending portion, a small axial undercut is formed as shown in the drawings. Neither the axial nor the angular portions of slots 158 have been separately numbered in the drawings; the same is true of the undercuts.

A portion of exterior wall 156 of tubular member 142 is cut away; preferably this is a portion subtending an angle of about 180° relative to the axis of tubular member 142. This cutaway serves to expose an interior wall portion 154 of tubular member 142 as illustrated generally at the top of FIG. 6. Within the cutaway portion, a screw stop 152 is provided in the remaining wall portion of tubular member 142. The head of screw 152 desirably fits into the portion of the wall of tubular member 142 which would be the interior thereof, were the facing portion of the wall not cut away.

Apparatus 140 further includes a tubular conduit designated generally 162 in FIGS. 6 and 7. An end plug 166 closes one end of conduit 162. A fluid connecting member 172 is positioned in the other end of tubular conduit 162 for connection with a color supply line 139 leading from closable container 12 having liquid color and a diaphragm pump 18 located therewithin.

Second tubular conduit 162 further includes an axially slidable preferably cylindrically configured sleeve 164 which is desirably sized to fit slidably within tubular member 142. Tubular conduit 162 preferably further includes a cylindrical spacer 170, which is desirably fixed to tubular conduit 162 and is also sized for sliding entry into the interior of tubular member 142. A spring 160 is positioned between cylindrical spacer 170 and slidable sleeve 164 and wraps around tubular conduit 162. Spring 162 biases slidable sleeve 164 in a direction towards the top of the paper in FIG. 6, away from cylindrical spacer 170.

Extending laterally from cylindrical spacer 170 is a spacer pin 168 sized for mating engagement with one of slots 158.

A liquid color outlet aperture 174 is formed in tubular conduit 162 proximate the end thereof, adjacent to end plug 166.

When the dripless connection apparatus 140 is in the configuration illustrated in FIG. 7 where tubular conduit 162 is not resident within tubular member 142, tubular conduit liquid color outlet aperture 174 is covered by slidable sleeve 164. Desirably, the inner diameter of slidable sleeve 164 is only slightly larger than the outer diameter of tubular conduit 162 so that liquid color material cannot escape from the interior of conduit 162 through aperture 174 when aperture 174 is covered by slidable sleeve 164.

Because cylindrical spacer 172 is fixed to tubular conduit 162, spring 160 continuously biases slidable sleeve 164 into a position covering liquid color outlet aperture 174. Accordingly, even though tubular conduit 162 may be connected to a liquid color supply line 139 by connecting member 172 and liquid color may be within supply line 139, until slidable sleeve 164 is moved against the bias of spring 160 and exposes liquid color outlet aperture 174, no liquid color flow from dripless connection apparatus 140.

When it is desired to supply liquid color, tubular conduit 162 is inserted into tubular member 142 in the direction indicated by arrow A in FIG. 6. Slidable sleeve 164 enters tubular member 142 at second end 150 thereof and moves slidably through tubular member 142 until a forward annular end surface 176 of tubular member 142 contacts screw stop 152. As tubular conduit 162 is forced further into tubular member 142, interference between screw stop 152 and annular end surface 176 of slidable sleeve 164 precludes further movement of slidable sleeve 164 in the direction indicated by arrow A in FIG. 7. However, since the remainder of tubular conduit 162 continues to move in direction of arrow A in FIG. 7, the portion of tubular conduit 162 which is axially adjacent to end plug 166 continues to move in the direction of arrow A in FIG. 6, past screw stop 152. This relative motion between the portion of tubular conduit 162 residing within slidable sleeve 164 and slidable sleeve 164 itself exposes the portion of tubular conduit 162 within which liquid color outlet aperture 174 is located; this is illustrated in FIG. 7.

In order to secure apparatus 140 in this position at which liquid color may flow freely out of outlet aperture 174, tubular conduit 174 and cylindrical spacer 170 are moved manually further in the direction indicated by arrow A, against the bias resulting from spring 160 being compressed between cylindrical spacer 170 and slidable sleeve 164, until spacer pin 168 is in a position to enter slot 158. At that position, cylindrical spacer 170 is moved manually slightly axially further in the direction of arrow A until pin 168 reaches the angular portion of slot 158, whereupon a small manual rotation of cylindrical spacer 170 moves pin 168 into the angular portion of slot 158, where the axial undercut is located. This serves to retain tubular conduit 162 in engagement with tubular member 142 in the configuration illustrated in FIG. 7, whereby liquid color material may be delivered via outlet aperture 174.

For drawing clarity, dripless connection apparatus 140 in FIGS. 6 and 7 has been illustrated with only a single tubular conduit 162 engaging a tubular member 142. However, the invention embraces use of apparatus such as illustrated in FIGS. 6 and 7 to connect a plurality, and in any event at least two, closable containers 12 having liquid color diaphragm pumps 18 therewithin to a weigh scale blender for the direct supply of liquid color on demand to the weigh scale blender, specifically to the weigh pan of the weigh scale blender.

The disclosures of U.S. Pat. No. 6,007,236 and corresponding Patent Cooperation Treaty application PCT/US96/19,485 published as WO97/21,528 are incorporated by reference.

Figure 8:
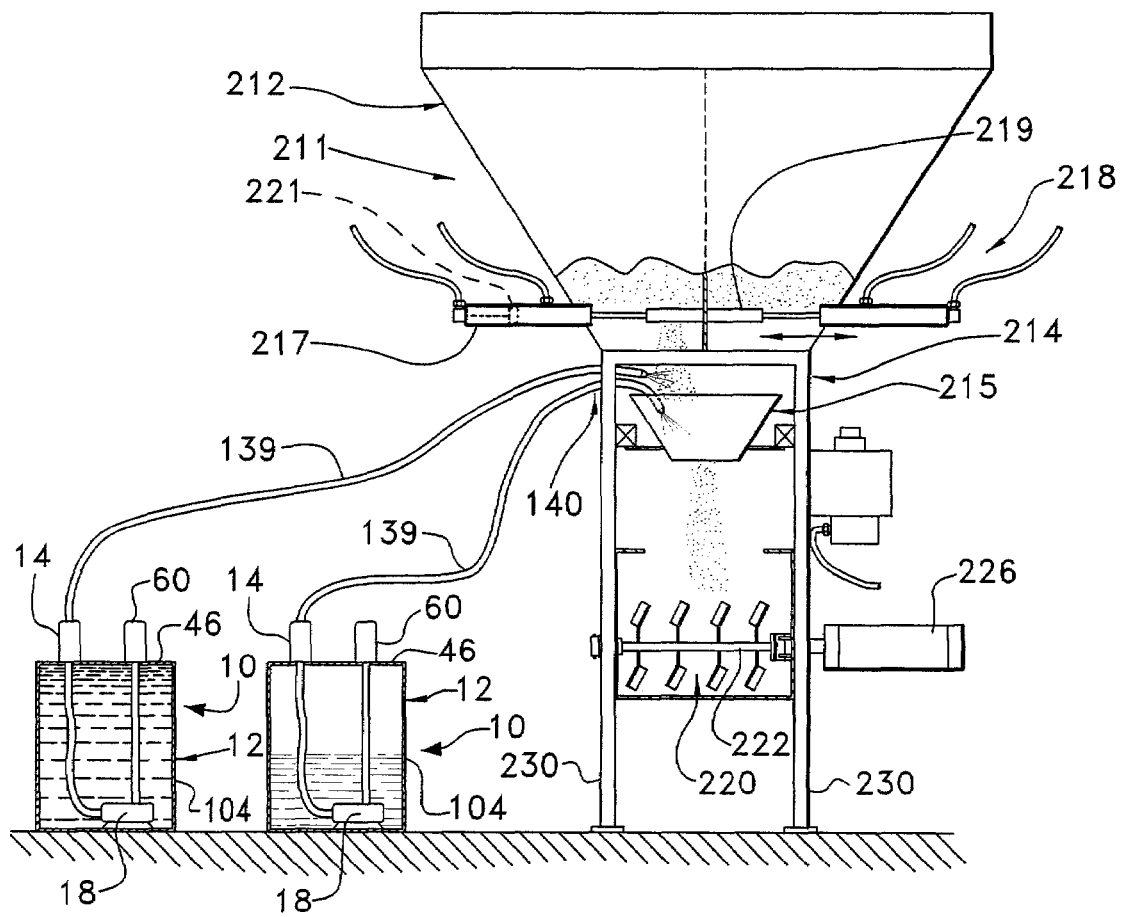
FIG. 8 is a schematic side elevation of a gravimetric blender connected to two closeable containers of liquid color material with liquid color diaphragm pumps therewithin in accordance with the invention.

Referring to FIG. 8, a weigh scale blender of the type disclosed in U.S. Pat. No. 6,007,236 and WO97/21,528 is designated generally 211 and includes a hopper, designated generally 212, supported by a frame designated generally 214 which holds a weigh bin 215 into which portions of plastic resin material and liquid color material are metered and optionally weighed prior to release into a mix chamber 220. Frame 214 may be a single piece or multiple pieces and as illustrated includes four upstanding members, which are preferably steel angle iron and are identified 230 with two of upstanding members 230 being shown in FIG. 8. Frame 214 preferably further includes webs connecting upstanding members 230 together to provide rigidity. These webs have not been illustrated.

Hopper 212 preferably has multiple internal compartments so that a plurality of different solid resinous materials may be dispensed from hopper 212 into weigh bin 215 preferably by orientation of suitable slide gates, designated generally 219, located at the bottom of a given compartment of hopper 212. Hopper 212 may also be provided as a plurality of individual hoppers, each having only a single compartment.

Weigh scale blender 211 preferably further includes pneumatically actuated piston means 221, housed within cylinders 217, which are connected with hopper 212 via slide gates 219. Piston means 221 operate in response to signals to move slide gates 219 thereby to release material stored within hopper 212 downwardly towards weigh bin 215. The pneumatic piston-cylinder actuated slide gate combinations are designated generally 218 in FIG. 8.

Alternatively, one or more auger feeders may be used in lieu of a portion of hopper 212 and an associated slide gate. Auger feeders are desirably used for components which are added at 5% or less to the mix blend; however, auger feeders add to the cycle time for each batch and reduce overall throughput rates. Hence, auger feeders are desirably optionally used only for addition of low percentage components to the blend to be mixed.

Positioned within and preferably slidably retained in place by frame 214 below weigh bin 215 is a mix chamber 220 having a mixing means which is preferably in the form of a mixing agitator 222 rotatably disposed therewithin. Agitator 222 is mounted for rotation about an axis preferably shared with a drive motor 226. Motor 226 preferably has its drive shaft positioned to drive mixing agitator 222 about the common axis. Drive motor 226 is preferably supported by a cantilever support, which has not been illustrated in the drawing for clarity, extending laterally from an upstanding member 230 of frame 214. Mix chamber 220 may be fabricated to be slidably removable from frame 214 with mix chamber 220 being moveable in a direction parallel with the axis of agitator 222. The blender 211 may be positioned to furnish blended resin material directly to a molding press or extruder.

A major advantage provided using the closable container 12 with liquid color and a diaphragm pump 18 therewithin together with the dripless connection apparatus 140 of the type illustrated in FIGS. 6 and 7 is facilitation of automatic changeover from a first closed container of liquid color material to a second closed container of liquid color material when the first container is exhausted without interrupting the cyclic supply of liquid color material to the weigh scale blender, or even to a process machine such as a molding press or an extruder.

One such arrangement is illustrated in FIG. 8 where two apparatus according to the invention for furnishing liquid color have been designated generally 10 and include closable containers 12 having liquid color therewithin and diaphragm pumps 18 within the closable containers 12. In this arrangement, the pumps 18 within liquid color containers 12 are desirably controlled by the same microprocessor which operates and controls the weigh scale blender 211. Liquid color material and resin material are respectively serially dispensed for preselected times with the liquid color material being dispensed by actuating a diaphragm pump 18 located within a container 12. Desirably pump 18 cycles by pulsing in response to the digital pulses of the microprocessor and the associated clock function as the microprocessor regulates the entire resin material-color blending process.

The blender operates to weigh the contents of the weigh bin 215 after each of the serial dispenses of liquid color material and resin material and compares the measured weight to a predetermined recipe amount for the given component. This process continues with such serial dispensing for so long as measured weight of the weigh bin contents compares properly to the predetermined recipe amount according to a present criteria. However, pumping is halted from a first container 12 and initiated from a second closable container 12 using the diaphragm pump 18 located within that second container to uninterruptedly continue the serial dispenses of liquid color and resin material into the weigh bin of the gravimetric blender whenever the comparison indicates that there has been no dispense of liquid color material or an insufficient dispense of liquid color material from the first container into the weigh bin. Having both containers 12 connected to the blender 211 by dripless connection apparatus 140 permits the process to continue cyclically since as the first container 12 is exhausted and the pump 18 is actuated, color will continue to flow through a selected set of telescoping conduits of apparatus 140 without spillage. Once pumping from the second container has commenced, the first container may be disconnected using apparatus 140 and replaced with a fresh, full container 12.

While pneumatic power is the preferred form of power for the diaphragm pump in accordance with the invention, electrical, mechanical or hydraulic actuation of diaphragm 36 may also be provided.

While diaphragm pump 18 has been illustrated in all cases as being within liquid color container 12, diaphragm pump 18 might be located only partially within or even outside a suitable container 12.

While the interior portion of pump body 24 has been illustrated with a particular stepped generally cylindrical configuration, other shapes, both tapered and non-tapered, may also be utilized. Likewise, while springs 38 and 68 have been illustrated as coil springs, other spring forms and sources of bias such as leaf springs, bow springs and the like may also be used.

An advantage of the embodiment of the invention illustrated in FIG. 1 is that since pneumatic power is not introduced in the interior of container 12, there is little risk of leakage of liquid color material out of container 12.

While the liquid color diaphragm pump 18 has been illustrated as a diaphragm pump, a piston pump might also be used. However, a diaphragm pump is preferable because there is no moving seal, only a flexing diaphragm which remains airtight. If a piston pump were used and the piston seal leaked air, the leaking air would enter the liquid color container.

Resulting pressure buildup in the liquid color container could force the liquid color through the check valves and the entire contents of the container could empty just from the force of the leaking air. Accordingly, diaphragm power is preferable.

What is claimed is:

1. Apparatus for supplying liquid color to a plastic material processing machine, comprising:
   a. a sealable container for storing liquid color therewithin;
   b. a diaphragm pump within said container, the diaphragm pump:
      i. having a liquid color inlet to a first chamber bounded in part by said first side of the diaphragm proximate the container bottom, said diaphragm sealingly separating the pump into two interior chambers, said second side of said diaphragm sealingly bounding said second chamber from said first chamber and liquid color resident therein to maintain said second chamber liquid free; and comprising:
      ii. mechanical means contacting said diaphragm on said second side for reciprocatingly displacing said diaphragm into said first chamber to displace therefrom liquid color resident therein;
      iii. resilient means resident in said first chamber contacting said first side of said diaphragm to bias said diaphragm toward said second chamber when displaced by said mechanical means; and
      iv. means, positioned within the resilient means and being freely movable with respect thereto towards and away from the inlet, for closing the inlet to flow of liquid color from the first chamber back into the container; and
   c. a conduit connected to an outlet of said pump and passing through said container to deliver pumped liquid color from the first side of the diaphragm at the container exterior.

2. Apparatus of claim 1 further comprising self-sealing means connected to said conduit at the exterior of said container for preventing flow of liquid color out of said container via said conduit upon disconnection of said apparatus from a liquid color user.

3. Apparatus of claim 2 wherein said self-sealing means is a spring-loaded manually actuable quick-disconnect.

4. Apparatus of claim 2 further comprising liquid color within said container.

5. Apparatus of claim 2 wherein said pump is pneumatically actuated.

6. Apparatus of claim 2 wherein said pump is mechanically actuated.

7. Apparatus of claim 2 wherein said pump is electrically powered.

8. Apparatus of claim 1 further comprising liquid color within said container.

9. Apparatus of claim 1 wherein said pump is pneumatically actuated.

10. Apparatus of claim 1 wherein said pump is mechanically actuated.

11. Apparatus of claim 1 wherein said pump is electrically powered.

12. Apparatus of claim 1 wherein said pump further comprises:
   a. a body having a cavity formed therein, the cavity defining the first chamber;
   b. a cover connected to said body;
   c. a flexible diaphragm separating said cover from said cavity;
   d. said cover having a relief proximate the portion of said diaphragm separating said cover from said cavity, providing space defining the second chamber between said cover and said diaphragm.

13. Apparatus of claim 12 wherein said mechanical means for reciprocatingly displacing said diaphragm is pneumatically driven and operates cyclically.

14. Apparatus of claim 12 wherein said means for reciprocatingly displacing said diaphragm is an elongated rod and moves axially.

15. Apparatus of claim 14 wherein said means for displacing said diaphragm is electrically driven.

16. Apparatus of claim 14 wherein said means for displacing said diaphragm is mechanically driven.

17. Apparatus of claim 12 wherein said means for displacing said diaphragm moves rotatably.

18. Apparatus of claim 12 wherein said resilient means for biasing said diaphragm away from said cavity is a spring.

19. Apparatus of claim 18 wherein said spring is a coil spring.

20. Apparatus of claim 19 further comprising an outlet passageway communicating with said cavity adjacent to said diaphragm and leading to the exterior of said pump for conveyance of liquid color displaced from said cavity by said diaphragm out of said pump.

21. Apparatus of claim 20 wherein said pump exterior surface is a bottom surface of said pump body.

22. Apparatus of claim 20 further comprising an outlet passageway leading from a vertical extremity of said cavity to the exterior of said pump for conveyance of liquid color displaced from said cavity by said diaphragm out of said pump.

23. Apparatus of claim 22 wherein said outlet passageway has a vertical portion and said pump further comprises a first freely vertically movable ball residing in said outlet passageway vertical portion, for blocking downward liquid flow within said outlet passageway and into said pump.

24. Apparatus of claim 20 wherein said body has an inlet passageway connecting a pump exterior surface to said cavity, at least a portion of said passageway being substantially vertical, and said closure means further comprises a first freely vertically movable ball residing in said passageway vertical portion, for blocking downward liquid flow within said passageway and out of said pump.

25. Apparatus for supplying liquid color to a plastic material processing machine, comprising:
   a. a sealable container for storing liquid color therewithin;
   b. a pump within said container, having an inlet proximate the container bottom;
   c. a conduit connected to an outlet of said pump and passing through said container to deliver pumped liquid color at the container exterior;
   d. a body having a cavity formed therein;
   e. a cover connected to said body;
   f. a flexible diaphragm separating said cover from said cavity;
   g. said cover having a relief proximate the portion of said diaphragm separating said cover from said cavity, providing space between said cover and said diaphragm;
   h. means for cyclically displacing said diaphragm away from said relief area of said cover and into said cavity;
   i. means for biasing said diaphragm away from said cavity, towards said relief area of said cover and into said space during a portion of each cycle of diaphragm displacement;
   k. wherein said means for biasing said diaphragm away from said cavity is a spring;

l. wherein said spring is a coil spring
m. wherein said body has an inlet passageway connecting a pump exterior surface to said cavity, at least a portion of said passageway being substantially vertical, and said pump further comprises a first freely vertically movable ball residing in said passageway vertical portion, for blocking downward liquid flow within said passageway and out of said pump; and
n. wherein said ball is within said spring.

26. Apparatus for supplying liquid color to a plastic material processing machine, comprising:
a. a sealable container for storing liquid color therewithin;
b. a pump within said container, having an inlet proximate the container bottom;
c. a conduit connected to an outlet of said pump and passing through said container to deliver pumped liquid color at the container exterior;
d. a body having a cavity formed therein;
e. a cover connected to said body;
f. a flexible diaphragm separating said cover from said cavity;
g. said cover having a relief proximate the portion of said diaphragm separating said cover from said cavity, providing space between said cover and said diaphragm;
h. means for cyclically displacing said diaphragm away from said relief area of said cover and into said cavity;
i. means for biasing said diaphragm away from said cavity, towards said relief area of said cover and into said space during a portion of each cycle of diaphragm displacement;
k. wherein said means for biasing said diaphragm away from said cavity is a spring;
l. wherein said spring is a coil spring
m. wherein said body has an inlet passageway connecting a pump exterior surface to said cavity, at least a portion of said passageway being substantially vertical, and said pump further comprises a first freely vertically movable ball residing in said passageway vertical portion, for blocking downward liquid flow within said passageway and out of said pump;
n. wherein said ball is within said spring; and
o. wherein said spring constrains said ball against lateral movement.

27. Apparatus for furnishing liquid color on demand, comprising:
a. a container having a quick disconnect fining for output of liquid color therefrom;
b. means, within said container, for pumping liquid color out of said container responsive to pressurized gas furnished thereto, comprising:
i. an upper portion;
ii. a body connected to said upper portion, having an open interior cavity facing said upper portion, a liquid color inlet communicating with said open interior cavity and a liquid color outlet also communicating with said open interior cavity remotely from said inlet aperture;
iii. a check valve within said inlet for permitting inflow of liquid from within said container into said open interior cavity but blocking outflow from said open interior cavity into said container;
iv. a diaphragm between said upper portion and said open interior of said body, edges of said diaphragm being sandwiched between said upper portion and said body, being distendable towards and into said open interior cavity of said body responsively to application of force to a diaphragm side facing oppositely from said open interior cavity to displace liquid having entered said open interior of said body through said liquid color inlet from said body through said outlet and out of said container via an outlet connection by urging a diaphragm surface facing said open interior cavity of said body against liquid color present therein;
v. a spring for biasing said diaphragm away from said open interior of said body
vi. wherein the check valve is within the spring and is freely movable with respect thereto relative to the inlet for closing the inlet to flow of liquid color from the interior of the pumping means back into the container.

28. Apparatus of claim 27 further comprising liquid color in said container.

29. Apparatus for furnishing liquid color on demand comprising:
a. a container having a liquid color outlet connection;
b. a pneumatic piston-cylinder combination removably connected to said container and having an output shaft, for providing pneumatically-driven reciprocation of said output shaft thereof,
c. a reciprocable rod within said container and adapted for reciprocating driving thereof by said output shaft of said piston-cylinder combination;
d. diaphragm pump means, housed at least partially within said container, for pumping liquid color out of said container via said outlet connection, comprising;
i. an upper housing part having a relief with an aperture therein;
ii. a body connected to said upper housing part and having an open interior cavity facing said relief of said upper housing part, said body having a liquid color inlet aperture communicating with said open interior cavity and an outlet aperture communicating with said open interior remotely from said inlet aperture;
iii. a check valve at said inlet aperture including a closure member for permitting inflow of liquid color from within said container into said open interior cavity but blocking efflux of said liquid color outwardly from said open interior cavity through said inlet aperture;
iv. a diaphragm between said upper housing part and said open interior cavity of said body, being distendable towards and into said open interior cavity of said body responsively to axial reciprocating movement of said rod through said aperture in said relief of said upper housing part to serially displace liquid in said open interior cavity from said body through said outlet orifice and out of said container via said outlet connection; and
v. a spring for biasing said diaphragm away from said open interior portion of said body and into space proximate said relief
vi. wherein the closure member is within the spring and is freely movable with respect thereto relative to the inlet for closing the inlet to flow of liquid color from the pump interior back into the container.

30. Apparatus of claim 29 further comprising liquid color in said container.

31. Apparatus for supplying liquid color to a plastic material processing machine, comprising:
a. a container for storing liquid color therewithin;
b. a rod reciprocably displaceable into said container; and c. said container including a diaphragm pump for providing liquid color flow from said container responsively to reciprocation of said rod, the diaphragm pump comprising:
  i. a diaphragm sealingly separating a cavity within the pump into two interior chambers, the diaphragm sealingly bounding a second one of the chambers from a first one of the chambers and liquid color resident therein to maintain the second chamber liquid free;
  ii. mechanical means connected to the rod and contacting the diaphragm on the second side for displacing the diaphragm into the first chamber to displace therefrom liquid color resident therein;
  iii. resilient means resident in the first chamber contacting the first side of said diaphragm to bias the diaphragm toward the second chamber when displaced by the mechanical means; and
  iv. means, positioned within the resilient means and being freely movable with respect thereto towards and away from the inlet, for closing a pump inlet to flow of liquid color from the first chamber back into the container.

32. Apparatus of claim 31 wherein said container is sealable.

33. Apparatus of claim 31 further comprising liquid color within said container.

34. Apparatus of claim 31 wherein said rod is pneumatically actuated.

35. Apparatus of claim 31 wherein said rod is mechanically actuated.

36. Apparatus of claim 31 wherein said rod is electrically powered.

37. Apparatus of claim 31 further comprising a piston for drivingly reciprocating said rod.

38. Apparatus of claim 37 wherein said piston is pneumatically actuated.

39. Apparatus of claim 37 wherein said piston is hydraulically actuated.

40. Apparatus of claim 31 wherein said diaphragm flexes away from said first chamber upon retracting movement of said rod relative to said diaphragm and said first chamber.

41. Apparatus of claim 31 wherein said diaphragm resiliently self-flexes away from said first chamber upon retracting movement of said rod relative to said diaphragm.

42. Apparatus of claim 31 wherein said diaphragm relaxes upon retracting movement of said rod relative to said first chamber cavity.

43. Apparatus of claim 31 wherein said diaphragm relaxes upon retracting movement of said rod away from said diaphragm.

44. Apparatus of claim 31 further comprising means for biasing said diaphragm towards a position from which said rod displaces said diaphragm into said first chamber.

* * * * *